Nov. 2, 1937.  P. R. WHEELER  2,098,021
CONTROL SYSTEM FOR TRANSMISSIONS
Filed June 30, 1932   3 Sheets-Sheet 3
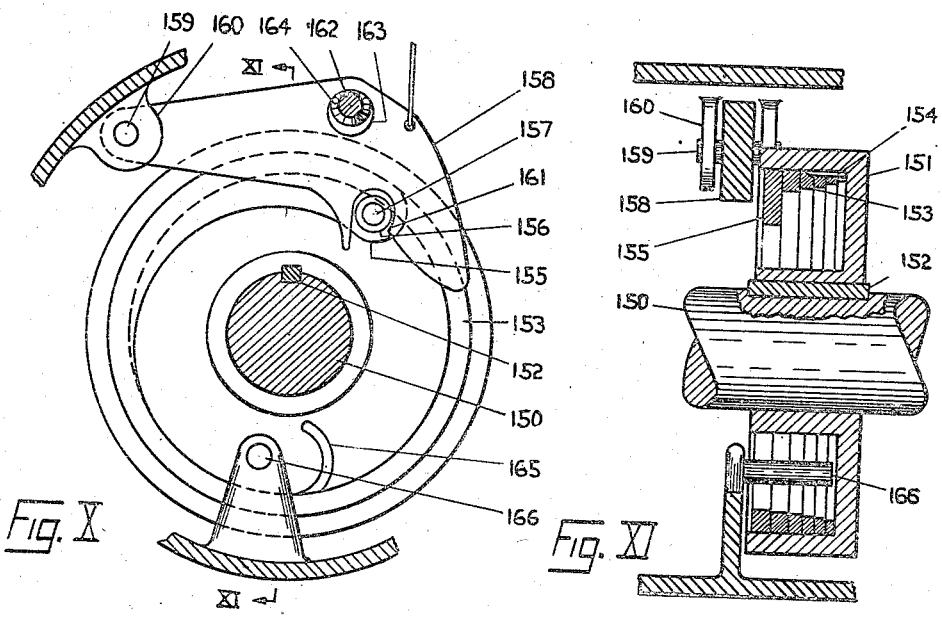
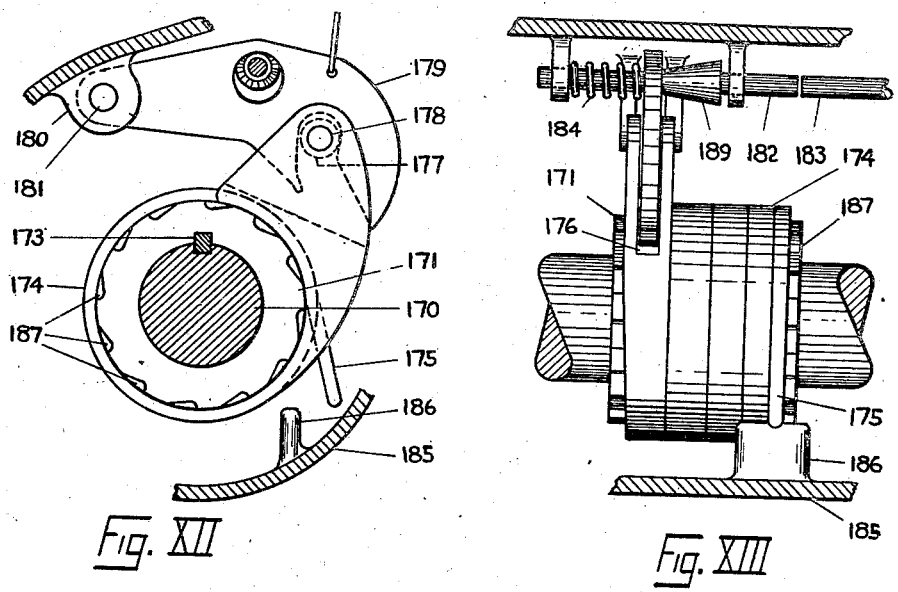
Inventor
Phillip R. Wheeler
By
Attorney Patented Nov. 2, 1937

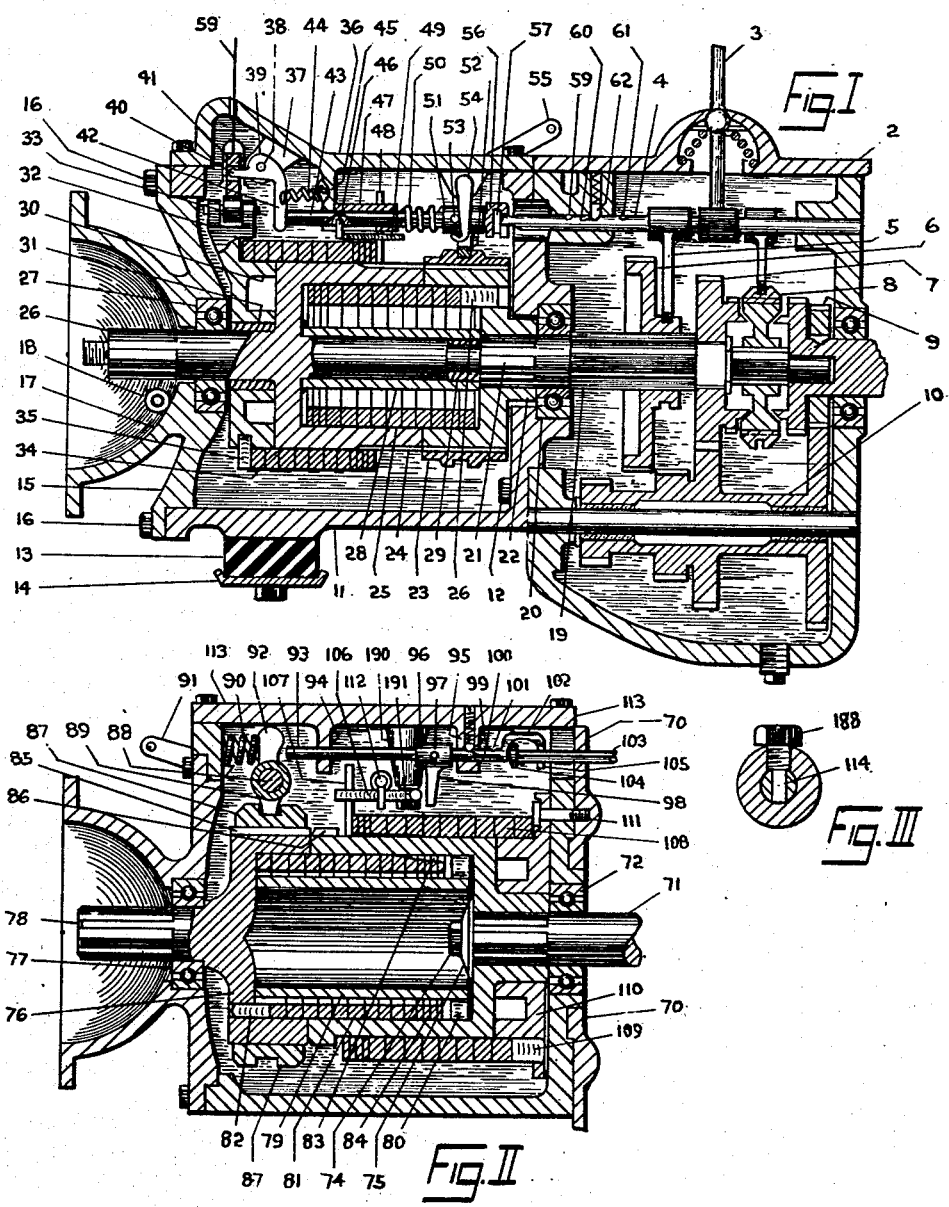

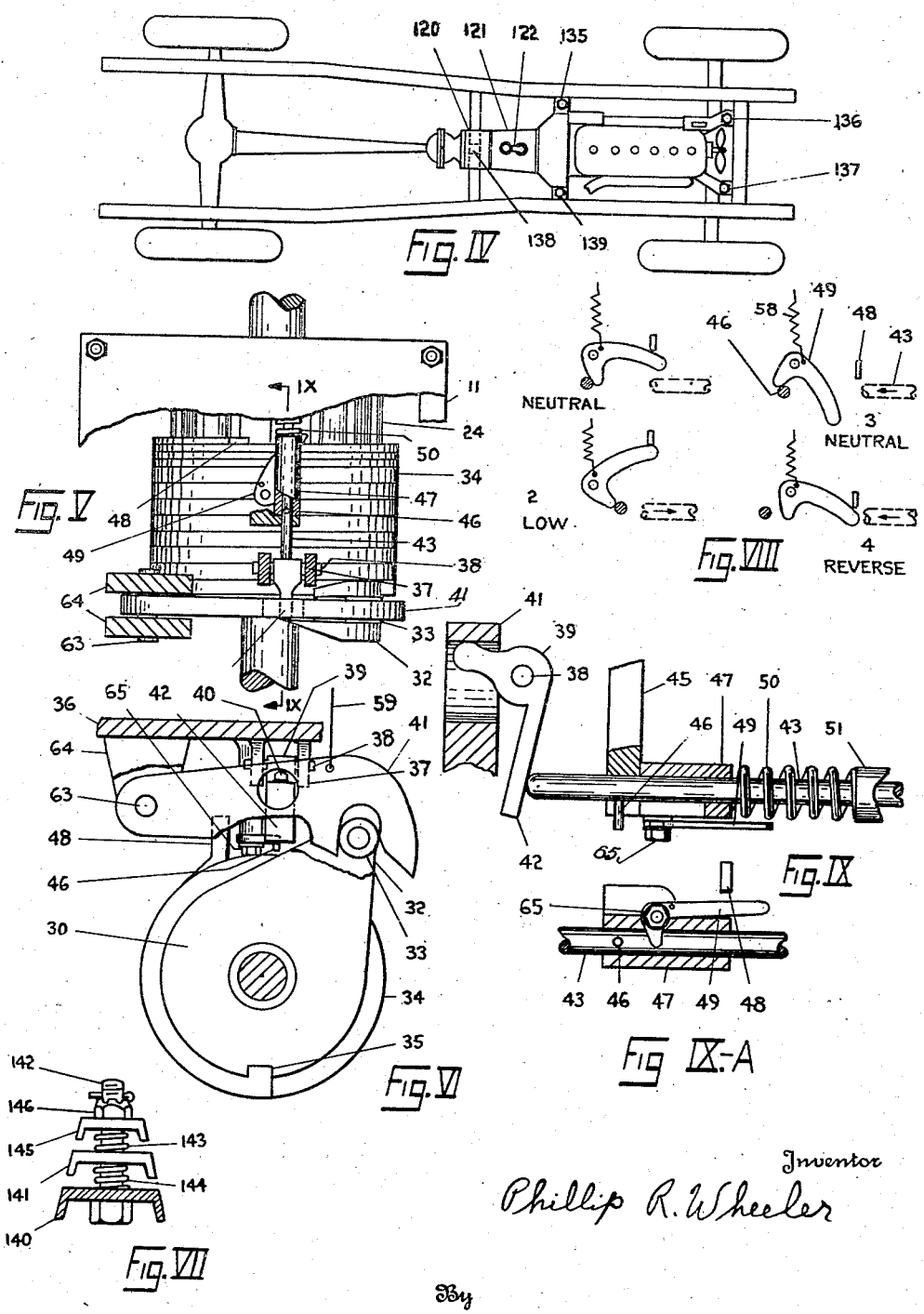

2,098,021

UNITED STATES PATENT OFFICE 2,098,021

CONTROL SYSTEM FOR TRANSMISSIONS

Phillip R. Wheeler, Alexandria, Va.

Application June 30, 1932, Serial No. 620,268

21 Claims. (Cl. 192—4)

The object of this invention is to provide a no-back device for use with automotive vehicles which shall be simple in construction and entirely automatic in function, when adapted to the controls of conventional transmissions.

A further object of this invention is to provide a combination free-wheeling and no-back unit which requires a minimum of parts, the combination unit being controlled by connection with the shifting lever of any conventional transmission.

A further object of this invention is to provide a construction which acts as a shock absorber to relieve the shock which occurs due to the backward motion of a car, permitted by the "backlash" or clearance in the driving gears at the rear, in the differential and in the universal joints.

Figure I is a longitudinal sectional view of a combined synchro-mesh gear transmission, and a free-wheeling and no-back unit.

Figure II is a longitudinal sectional view of a modification of a combined free-wheeling and no-back unit.

Figure III is a partial view showing the means of assembly for manual lock-out control of the no-back shown in Figure II.

Figure IV is a diagrammatic plan view of a car chassis, showing a no-back mounted behind a transmission and a form of flexible mounting adapted to act as a shock absorber for the no-back.

Figure V is a partial plan view of Figure I in which some of the parts have been cut away or removed.

Figure VI is a partial end view of Figure V, some of the parts being removed or cut away.

Figure VII is an enlarged side view showing the method of spring mounting used in Figure IV.

Figure VIII shows four views of a control means for causing the no-back of Figure I to become effective upon going from reverse gear position to the low gear position.

Figure IX shows an enlarged partial side elevation of the control rod and mechanism of Figures V and VI.

Figure IX-A is a bottom view of a part of Figure IX.

Figure X is an end view of a modified form of no-back.

Figure XI is a sectional view of Figure X.

Figure XII is an end view of still another form of no-back.

Figure XIII is a side view of Figure XII.

Referring to Figure I (see also Figures V, VI, VIII, IX and IX-A), a transmission case is designated at 1, a cover for the case at 2, and a gear shift lever at 3. A shifter rod, 4, carries the fork 5 which controls the low and reverse gear 6. The second speed gear is shown at 7 and a synchro-mesh mechanism at 8. The countershaft drive gear is shown at 9 and the countershaft gears at 10.

The free-wheeling and no-back housing is shown at 11, this being solidly secured to the transmission housing with cap screws or bolts, as at 12. A flexible mount or rear support is shown at 13, this being rubber or other resilient or shock absorbing material. The cross member 14 has connection with the car frame. This flexible mounting of the housing acts as a shock absorber for the no-back as the housing resists the turning moment of the drive shaft when the no-back operates. This shock absorber is especially desirable because of the back lash, or clearance, in the rear driving gears, which is present in all cars. The universal joints and differential gears also have a small amount of lost motion at times, which adds to that of the ring and pinion gears. This lost motion permits a car to acquire a slight backward velocity before stopped by the no-back. The then sudden stopping causes a considerable shock to the car and passengers unless some means of absorbing it is provided.

The rear part of the housing 15, is secured to the main part by means of the cap screws 16. The flange 17 serves as part of the universal housing and the boss 18 is provided for the speedometer drive.

The transmission main shaft 19 is supported at the rear by the ball bearing 20. The spline 21 carries a cup member 22, which is the driving part of the free-wheeling unit. This cup is splined on the outside and carries the sleeve 23, this serving as a lock-out member to connect the front cup 22 with the rear cup 24.

The internally expanding spring 25 has a running fit inside of both the cup members. One end is secured to the forward cup member as shown at 26 and the other end is slightly expanding, exerting a small amount of initial pressure and friction on the rear cup. The rear cup carries the splined shaft 26 which is supported by the ball bearing 27. The internal sleeve 28 is solidly secured to the rear cup by welding or other means and is supported on the other end by the bearing 29. This sleeve serves to keep the two cups and the transmission shaft in alignment.

To the rear of the rear sleeve is a floating collar 30, this having a bushing 31 between it and the shaft. The collar 30 has the arm 32 which carries a roller 33. Above the roller is shown a midsection of a stop arm which normally engages the roller to prevent the collar 30 from rotating. A pin 63 secures the stop arm to the ears 64 which are integral with the cover 36 (see Fig. VI). A side view of a similar stop arm is shown in Figures X and XII. The collar 30 has the spring 34 attached to it as shown at 35.

Fitting over the top of the free-wheeling and no-back housing is a cover 36, this cover having projections inside for carrying the control elements of the free-wheeling and no-back. A pair of ears 37, have a pin 38 carrying a bell crank 39. This bell crank has one end 40 resting in an opening of the stop arm 41 so that as the end of the rod 43 is moved to the left, the stop arm is given an upward movement, releasing the roller as can be seen from an inspection of Figure IX. The spring 44 normally holds the bell crank in the position shown.

A projection 45 on the inside of the cover serves as a support for the rod 43. The bottom of the hole which the rod passes through is slotted to permit the pin 46, which is pressed or otherwise secured to the rod, to pass as the rod is moved to the left. Fitted over the rod is a sleeve 47, which is also slotted for the pin 46, and serves as a stop for the end 48 of the spring 34. The bell crank 49 is pivotally supported on the bottom of the projection 45. One arm is engaged by the pin 46 as it moves to the right, this causing the other end to push against the end 48 of the no-back spring.

The coil spring 50 presses against the end of the boss 51 which carries the fork or yoke 52 engaging the slot in the free-wheeling lock-out sleeve. The boss also has the ears 53 which engage the fork 54 of the free-wheeling manual lock-out control, this manual lock-out being operated by the lever arm and Bowden wire or other means as shown at 55. The boss 51 is slidably mounted on the rod 43. The end of the shifter rod 4 has a head 57 which engages the double forked end 56 of the control rod 43. This connection with the low and reverse shifter rod 4 causes the two rods to move together, moving to the right when a shift is made to low gear and to the left when a shift is made to reverse gear.

The free-wheeling and no-back controls are all assembled on the cover 36, these controls then being put in place as a unit. This facilitates assembly, inspection, adjustment or repair of the unit.

In Figure VIII are four sketches showing relative positions of the pin 46, the bell crank 49 and the end of the no-back spring 48. A light spring 58 attached to the bell crank is also shown.

Referring to Figure I again, the low and reverse shifter rod has three depressions or notches 59, 60, and 61 for low, neutral and reverse respectively. These are engaged by a spring-pressed detent 62.

In operation the free-wheeling is effective in all forward speeds unless locked out with the manual lock-out control, which may be by a button on the dash, a lever or other connection as indicated at 55. The arm seen at 55 is secured to a shaft carrying the fork 54, which moves backward upon a downward motion of the lever, causing the fork 52 to move the lock-out sleeve 23 into engagement with the rear free-wheeling cup 24. This secures the two free-wheeling cups together, eliminating the free-wheeling.

This movement also occurs whenever the driver shifts the transmission into reverse gear. This is accomplished by means of the shifter rod 4 moving to the left and pushing against the double forked head 56 which in turn moves the boss 51 which carries the fork 52. When the shift is made from reverse to the neutral position, the spring 50 returns the free-wheeling lock-out sleeve to the position shown, thus making the free-wheeling again effective. The free-wheeling may, however, be permanently locked out by use of the manual lock-out control.

The no-back, like the free-wheeling, is normally effective in all forward speeds and in neutral. Upon shifting into reverse it releases and remains released until a shift is made into low gear or until a slight forward movement of the car. Either one causes the no-back to be again effective.

When shifting to reverse, the transmission shifter rod 4 moves the control rod 43 to the left from the position shown. This moves the bell crank 42, the end 40 lifting the stop arm 41. As may be seen from Figures V, VI, and IX-A, or from Figures X and XII, the backward movement of the spring caused by the turning of the drive shaft moves the end 48 into contact with the sleeve 47 surrounding the control rod. This acts as a stop, preventing further movement but tending to unwind and enlarge the coils of the no-back spring. The opposite end of the no-back spring being released, the rear free-wheeling cup 24 turns freely inside the no-back spring in the reverse direction. Reverse is clockwise, as seen in Figure VI.

When a shift is made back to neutral, the stop arm remains resting on the roller as shown in Figure IX. Then when a shift is made from neutral to low gear, the pin 46 secured in the control rod 43, engages one end of the bell crank 49, moving this and causing a slight rotational movement of the spring, this movement being sufficient to latch the roller 33 under the stop arm again. The no-back is now effective and remains so until a shift is again made to reverse gear or until it is manually released by means of the connection 59. This manual release would be used when it was desired to push the car backward and forward, as in a garage.

The operation of the means for making the no-back effective after being in reverse, by shifting into low gear, can be better understood by examining Figures V, VI, VIII, IX and IX-A in conjunction with Figure I. The parts shown in these other figures are numbered the same as in Figure I but show additional views so that the construction and operation can be more easily understood.

In Figures V and VI are shown the ears 64 which are integral with the cover 36 and to which the stop arm 41 is secured with the pin 63. Also is shown the nut 65 which holds the bell crank 49 in place.

Figure IX is an enlarged partly sectioned view of the control rod 43, bell crank 39 and stop arm 41 taken on the line IX—IX. Figure IX-A is a bottom view of a part of Figure IX.

In Figure VIII are shown four sketches. Sketch No. 1 shows the neutral position for the pin 46, the bell crank 49 and the spring end 48, these parts being in this position after shifting from reverse to neutral. In sketch No. 2, which shows the positions after a shift is made to low, the rod 43 and pin 46 have moved to the right, swinging the bell crank and moving the end of the no-back spring. From Figure IX it will be seen that as the end 48 is moved to the right, the arm 32, which is a part of the collar to which the other end of the spring is attached, will also be moved so that the roller will fall under the hook of the stop arm.

From sketch No. 2 it will be seen that as the shift is made to low, the pin 46 moves clear of the bell crank end so that the tension of the no-back spring, which is greater than that of the small spring, 58, causes the bell crank to move back so as to be on the opposite side of the pin 46. Then when shifting from low to neutral the relative positions assumed are those shown in sketch No. 3. Then as long as no shift is made to reverse, the bell crank retains the position seen in No. 3. When, however, a shift is made to reverse, the pin 46 clears the end as shown in sketch No. 4 and the spring 58 pulls the bell crank arm to the opposite side of the pin.

This sequence of operation for the no-back makes it effective at all times when it is needed and automatically releases it at any time when the transmission is shifted to reverse gear. If it is desired to back down a hill, it is only necessary to shift to reverse. The car will then roll backwards even though the gear shift lever is moved to the neutral position. If it is wished to stop and start up the hill, it is only necessary to bring the car to a stop and shift into low gear, when the no-back will become effective and hold the car against backward movement while the driver is getting started.

Referring to Figure II, the parts are in general similar to those of Figure I, except that the no-back spring is mounted on the opposite end of the free-wheeling unit and the control used for it is somewhat different.

This no-back and free-wheeling unit can in general be mounted to the rear of any transmission, the same as that in Figure I. The control is by a connection to the low and reverse shifter rod or fork, the same as in Figure I, and the sequence of operations is much the same. That is, both free-wheeling and no-back are effective in all forward speeds and both lock out when a shift is made to reverse. Both are again effective when a shift is made to low gear. This is similar to Figure I except that the free-wheeling of Figure I is effective upon shifting from reverse to neutral, whereas in Figure II, neither one is effective until a shift is made to low.

At 70 is designated a portion of a transmission housing. A portion of the rear of the transmission main shaft is seen at 71. This is supported by a ball bearing 72. Mounted on the end of the shaft is a free-wheeling cup 73, this being secured by a bolt and washer 74 and 75. Butting against the front cup is the rear free-wheeling cup 76. This is supported by the ball bearing 77 and has the splined end 78 for connection to a universal. The alignment sleeve 79 is solidly secured to the rear cup 76 by welding or other means and has the bearing 80 between its opposite end and the front sleeve. The internal spring 81 has a running fit on the inside surfaces of the two cups and has one end secured to the rear cup as shown at 82. The other end has oil grooves cut as at 83. The end coils designated at 84 have an initial outward pressure against the front cup. The outside of both cups is splined as at 85 and 86. The lock-out sleeve 87 is designed to slide forward and cover portions of both cups when a shift is made to reverse or when it is wished to lock out the free-wheeling unit.

The shaft 88 has secured to it a fork, one leg of which is designated at 89. Secured to the end of the shaft is a lever arm 91, this having connection with a button on the dash, a lever or other means for operating it. A spring 90 for returning the free-wheeling lock-out sleeve to the free-wheeling position, engages a projection 92 on the top of the fork 89. This projection on top is engaged by the end of the control rod 93. The projections 94 and 95 support and guide the rod. A boss 96 having a projection 98 is secured to the rod by means of the pin 97. A spring pressed plunger 99 engages the depressions or notches 100 and 101.

The end of the control rod has a double forked end 102 engaging a rod 103 which has connection with the low and reverse shifting mechanism of any transmission. It will be noted that the rod 103 can move between the two points 104 and 105 without causing motion of the rod carrying the double forked end. The parts in the position shown represent neutral for the transmission with the free-wheeling and no-back both effective. In shifting from neutral to low, the head of the rod 103, seen at 104, moves to the point 105. This causes no movement of the forked rod. However, in shifting to reverse from the neutral position, the forked rod 93 is moved to the left, causing the free-wheeling unit to be locked out. Also the projection 98 engages one arm of the bell crank 106, the other arm of the bell crank engaging the end 107 of the no-back spring 108. The bell crank 106 is mounted on a projection 190 of the cover 113 and is secured to the projection with the bolt 191. The end 107 is pushed backwards, causing an opening of the coils of the spring and so releasing the free-wheeling cup which it encircles. The no-back spring is also secured at 109 to a collar 110. The collar is stationary and is secured to the housing by means of the bolts 111.

The bell crank which causes the movement of the end of the no-back spring is also engaged by a sliding hook 112, this going through the housing and having connection to a manual lock-out control for the no-back. Figure III shows a slightly enlarged sectional view through the boss supporting the hook 112. This hook engages the arm of the bell crank 106 about midway between the spring end 107 and the bolt 191. In assembly it is necessary to insert the hook after the cover 113 carrying the rest of the control mechanism has been put in place. As seen in Figure III, the sliding rod carrying the hook 112 is slotted on the end coming through the outside of the housing. The cap screw 188 being removed, the hook can be turned and drawn back close to the housing, the cover put in place, the hook then turned up until it is horizontal and slid over past the bell crank when it can be turned down to the position shown. The cap screw is then inserted in the slot 114 to hold the hook 112 in the proper position.

In operation this free-wheeling and no-back unit is effective in all forward speeds, that is, the car free-wheels at any time the car tends to move forward faster than the engine and the no-back holds the car at any time when it tends to move backwards. When a shift is made to reverse gear, the rod 103, which is connected with the low and reverse shifter mechanism, moves to the left as shown in Figure II. In doing so the arm 98 engages the bell crank 106, this pushing the end 107 of the no-back spring so that the spring opens up. The depression or notch 101 in the control rod 93 then falls under the plunger 99 so that the control rod and spring are held in this position. At the same time the end of the control rod 93 hits against the arm 92 of the free-wheeling lock-out fork. This pivots about the shaft 88 and moves the sleeve 87 forward so that it covers the spline on both of the free-wheeling cups.

Upon shifting back into neutral, the head of the rod 103 moves from its position 104 to 105, this causing no movement of the rod 93, which is held in its position at the left by the plunger 99. This is desirable as many drivers often move the gear shift lever from the reverse position to the neutral position while the car is still coasting backwards. In case the control rod 93 followed the rod 103 to the right when the shift was made to neutral, the no-back would immediately become effective, and if the car had not already come to a stop, would stop the car with somewhat of a shock. However, it is normally impossible to make a shift into low gear until the car has practically stopped moving backwards, so that the time when a shift is made to low gear is the logical time for the no-back to again become effective. This is accomplished by the head of the rod 103 pulling on the forked end 102 of the control rod 93. Both rods move to the right as the shift is made from neutral to the low position, disengaging the depression or notch 101 and engaging depression or notch 100.

In Figure IV is shown diagrammatically a form of flexible mounting for the assembled unit of the engine, transmission, and free-wheeling and no-back. The assembled unit here is supported at five points, 135, 136, 137, 138, and 139. A no-back is shown at 120, attached to the transmission 121, and a gear shift lever at 122. In Figure VII is shown an enlarged detail of the mounting at the first four points. A member secured to the car frame is designated at 140, a part secured to the engine at 141. The bolt 142 passes through both parts and the springs 143 and 144 are inserted as shown. A washer 145 and nut 146, keep the assembly in place.

In Figures X and XI is shown a modification of a no-back using a coil, or spring type of clutch. A portion of a drive shaft is shown at 150. A drum 151 is secured to this by means of the key 152. Fitting closely inside of the drum is a coil member 153, this being of reduced section on the inside end. Oil grooves 154 are cut in the contact surface of the spring. The outer end of the coil 155 is of heavier section. Secured to this end is a roller 156, this being held by means of the pin 157. Engaging the roller is a stop pin 158, this being secured by means of a pin 159 to a portion of the housing 160. The surface 161 of the stop arm is cut as a circle arc about the pin 159. At 162 is shown a release or control rod which is designed to have connection with the low and reverse shifter mechanism of a transmission. Mounted on this rod is a cam or cone 164, so that as the rod is moved toward the reader, the stop arm will be raised, thereby releasing the roller and permitting a clockwise rotation of the coil member.

The small end of the coil member is hooked inwardly as at 165 so that after a slight clockwise rotation it engages the pin 166. Holding the spring from this end tends to wind it up and make it smaller, thus permitting a backward movement of the driving shaft. The surface 161 being a circle arc about the pin 160, only a small amount of effort is required to raise the stop arm, even though the no-back is acting as when stopped on a hill. Connections are made to a transmission so that whenever a shift to reverse is made, the cone 164 raises the stop arm and releases the no-back.

In operation this no-back is similar in principle to the external coil type shown in Figures I and II, the small end of the spring having an initial pressure with a resulting small amount of friction which starts the spring to expanding whenever there tends to be a clockwise rotation of the shaft. The action is then cumulative through the coils and they lock tightly against the drum.

In Figures XII and XIII is shown another modification in which an external type of coil is used, and a release mechanism similar to that of Figures X and XI. A portion of a drive shaft is designated at 170. A collar 171 is secured to it by means of the key 173. Surrounding the collar is the coil member 174. This has a reduced end which leaves the collar at a tangent as shown at 175. The other end of the coil is of heavier section and is milled out as shown at 176. A roller 177 is mounted in the milled opening by means of the pin 178. A stop arm 179 engages the roller and is held to a portion of the housing 180 by means of the pin 181. The release rod 182 is in line with a rod 183 which has connection with the reverse shifting mechanism of a transmission. Mounted on the release rod is the cone 189 and surrounding it is the spring 184. The bottom of the housing 185 has a projection 186 which is in line with the end 175 of the coil. Oil grooves 187 are cut in the surface of the collar 171.

In operation this no-back is similar to that shown in Figures X and XI, except that the coil is external instead of internal.

I claim:

1. In a no-back device for controlling the movement of a shaft, a coil-like member having several turns about the shaft, the said member being designed to tighten on the shaft when it is rotated in one direction and to loosen when the shaft is rotated in the other direction, means for holding one end of the coil-like member, means for releasing the said end, and means engaging the other end of the said coil member after the first said end is released.

2. In a no-back device, for use in combination with automotive transmissions and free-wheeling units, a coil spring member, the said coil spring having means for releasably holding one end, and means engaging the other end after the release of the first said end.

3. In a no-back device for use in combination with transmissions, a coil-like member surrounding a portion of a shaft, one end of the said coil-like member being of a heavier section, means for engaging and holding the said heavy end, means operably associated with a transmission for causing the release of the heavy end when the said transmission is shifted into reverse, means causing a slight initial friction between the small end of the coil-like member and the shaft, means engaging the small end when the heavy end is released, and a separate manual control for causing the release of the heavy end.

4. In a no-back device for use in combination with transmissions and free-wheeling units, a coil-like member surrounding a portion of a driving shaft, one end of the coil-like member having a sleeve mounted between it and the driving shaft, the coil end being attached to the sleeve and the driving shaft being rotatable in the sleeve, the other end of the coil member fitting closely about a rotating member, means for holding the said sleeve against rotation, means for releasing the sleeve to allow a backward movement and means engaging the other end of the coil member after the release of the said sleeve.

5. In a no-back device for use in combination with transmissions, a drum-like member attached to a portion of a driving shaft, a coil-like member fitting closely within the drum member, means for holding one end of the coil member against rotation, means operably associated with the gear shift lever of a transmission for causing the release of the said end when the transmission is shifted to reverse gear, and means engaging the other end of the coil member after the release of the first said end.

6. In a no-back device for use in combination with transmissions and free-wheeling units, a coil-like member adapted to engage a portion of a driving member, means for holding one end of the coil member against rotation and means adapted to cause a limited rotation of the other end of the coil member when the shifting lever of the transmission is moved to the reverse gear position, and also a separate manual control for causing such movement.

7. In combination, a selective speed transmission having two or more forward speeds and a reverse speed; a manual control for selecting any desired speed; a housing surrounding the transmission; a bearing support in the housing to support a driving shaft, the driving shaft protruding to the rear of the main assembly of the transmission; connection with the protruding part of the shaft to a one-way clutch mechanism, the one-way clutch mechanism having a coil member surrounding a rotating part, the said rotating part being part of a free-wheeling assembly; clutch means to permit relative rotation between two free-wheeling parts; an operable connection to the control lever of the selective speed transmission for locking the two free-wheeling parts together when the reverse speed is selected; a collar extending inside a few turns of the first mentioned coil, the end of the coil being secured to the collar; means for holding the collar against rotational movement; a connection to the transmission releasing the collar when the transmission is shifted to reverse; a stop engaging the opposite end of the first mentioned coil after a slight rotational movement of the coil.

8. In combination, a transmission having forward and reverse speeds, and a free-wheeling and no-back unit mounted to the rear of the transmission, the free-wheeling being of the coil clutch type, having an internal coil member within two adjacent cups; one of said cups being secured to the power take off shaft from the transmission and the other cup having connection with a drive shaft; a sleeve operable to lock the two cups together when the transmission is shifted to reverse; an outer coil member encircling a portion of one of the said cups, one end of said outer coil being secured to a collar, means for normally preventing rotation of the collar; means operably connected with the transmission to release the collar when a shift is made to reverse, and means engaging the free end of the coil member after the release of the said collar.

9. Claim 8 and a separate manual control for locking the two free-wheeling cups together.

10. In combination, free-wheeling and no-back parts assembled as one unit, a coil clutch member for the free-wheeling and a coil clutch member for the no-back; a part which both coil clutch members are adapted to engage; a second member which the free-wheel coil clutch engages, and a second member which the no-back coil clutch engages; means for locking out the free-wheeling; means for releasing the no-back to permit backward movement, said locking out and releasing means being adaptable to be operated by a shifting lever.

11. In a no-back device, a shaft, a coil like member having several turns about the shaft, means for holding one end of the coil like member against rotation, means to release the end to permit rotation, means engaging the opposite end of the coil member after slight rotation of the said member, and grooves cut in the engaging surface of the coil member to assist in relieving the oil film between it and the shaft.

12. In combination, a transmission having a forward speed change and reverse mechanisms, a no-back device of the class described and a free-wheeling device, the two said devices being placed together in one housing at the power take off side of the transmission, a driving shaft and a driven shaft, the free-wheeling device having a coil like member adapted to engage one member fixed to the driving shaft and another member fixed to the driven shaft, one end of the coil member being fixed to one of the members and the other end adapted to exert a slight initial friction on the other member, a manual control for positively locking the two said members together, and mechanism adapted to the control of the transmission for causing the two members to be locked together when the transmission is shifted to reverse, another coil like member engaging one of the members which the first mentioned coil member engages, means for releasably holding one end of the second coil member and means engaging the opposite end of the second coil member after the held end has been released, and means operably associated with the control mechanism of the said transmission for causing the release of the first mentioned or held end.

13. In a no-back device, a driven member, a coil clutch member having several turns about the driven member, one end of the coil member having an initial tension on the driven member, means for holding the other end of the coil member against rotation, means engaging the first mentioned end to hold it against rotation after the release of the second said end, and oil grooving cut in the engaging surface of the coil member next to the said driven member.

14. In a no-back device, a driven member, a coil clutch member adapted to prevent reverse rotation of the driven member, a sleeve, one end of the coil member having a few turns about the sleeve and being attached to it, the said sleeve being releasably held against rotation, and means for permitting reverse rotation of the said driven member after the release of the said sleeve.

15. In a no-back device, a part to be rotated, a coil member surrounding the part to be rotated, a stop, one end of the coil member being releasably held by the stop, a pin, the said stop means being rotatable about the pin, an engaging surface between the coil clutch holding part and the said stop the said engaging surface being a circle arc about the said pin and a roller engaged by the said circle arc part, the roller transmitting torque from the part to be rotated to the said stop.

16. In a no-back device for use in combination with transmissions, a drive member, a coil member surrounding a portion of the drive member, a stop arm, a housing for the no-back device, the said stop arm being secured at one end to the housing, an engaging surface on the stop arm which is a circle arc about the said secured end, a part having connection to the coil member for being engaged by the said circle arc surface of the stop arm, and means for moving the stop arm to cause the said coil member to be released from the circle arc engaging surface of the stop arm.

17. In a no-back device for preventing reverse rotation, a shaft member, a coil member adapted to engage the shaft member to prevent reverse rotation, a stop arm, a housing for the said parts, a pin securing the stop arm to the housing, a surface on the stop arm for engaging the end of the coil member, the said surface being a circle arc about the said pin, means for rotating the stop arm to cause the engaging surface to release the end of the coil member, a stop for the other end of the coil member, the said other end of the coil member engaging the stop after the release of the held end, and the said stop causing the coil to release the shaft member to permit backward rotation.

18. In a no-back device, a driven member, a coil member adapted to engage the driven member to prevent reverse rotation, means for holding one end of the coil member to prevent reverse rotation of it and the driven member, means to release the said held end, means then acting after the release of the held end to cause the coil member to release the driven member, the said driven member than remaining released until after reverse rotation has ceased and a slight forward rotation has taken place.

19. In combination, a shaft member, a coil type one way brake member associated with the shaft member, the said one way brake member being adapted to engage the shaft member to prevent rotation in one direction, a member engaging one end of the said coil member to hold it and the shaft member against reverse rotation, means for causing the said member to release the held end to permit slight reverse rotation, means then engaging the other end of the coil member to release it and permit reverse rotation of the said shaft member.

20. A device as set forth in claim 19 and a roller for transmitting torque from the coil member to the member holding the first said end of the coil member.

21. A device as set forth in claim 4 and the said holding means being pivotally held at one end, a surface on the holding means which is a circle arc about the pivot of the held end, a roller having connection to the said sleeve, the said circle arc surface being adapted to engage the roller or to release it.

PHILLIP R. WHEELER.